UNITED STATES PATENT OFFICE.

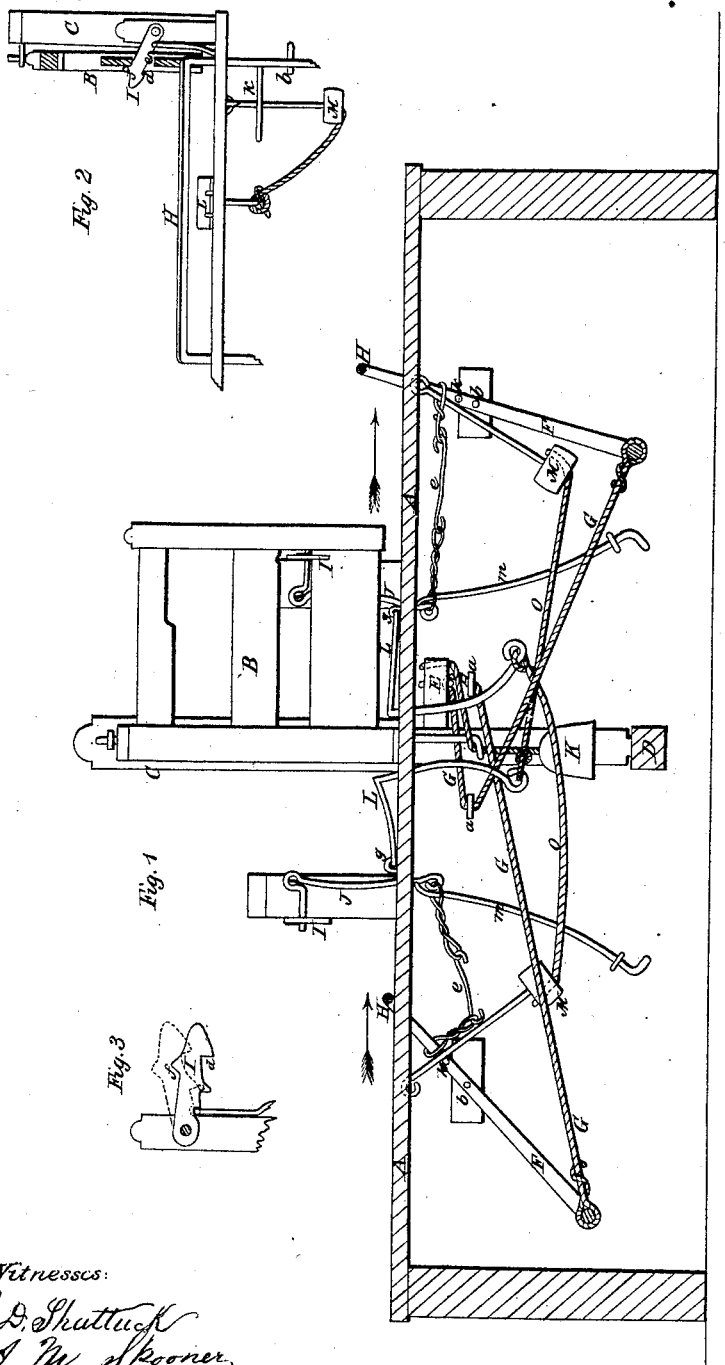

J. H. BUTLER AND P. G. VAN HOUTEN, OF COHOCTON, NEW YORK.

MODE OF OPERATING FARM-GATES.

Specification of Letters Patent No. 24,717, dated July 12, 1859.

*To all whom it may concern:*

Be it known that we, J. H. BUTLER and P. G. VAN HOUTEN, of Cohocton, in the county of Steuben and State of New York, have invented certain new and useful Improvements in Automatic Gates; and we do hereby declare that the following is a full and exact description of the construction and operation thereof, reference being had to the accompanying drawings, in which—

Figure 1. is a longitudinal section, showing one section of the gate open; Fig. 2. is an elevation of the post and latch, the gate being shown in section. Fig. 3. is a view of the latch I, detached.

Similar letters refer to corresponding parts in all of the figures.

As represented in the drawings A, is the surface of the road, consisting of planks or timbers which cover an excavation beneath of sufficient size to receive the actuating parts.

The gate, B, is constructed in two parts, opening at the center in either direction. The uprights of the gate frames which attach to the posts C, extend below the surface and rest on a block, or box, D, in which they turn. From each of these uprights an arm E, extends underneath the gate, to which are attached chains or cords, G G, which pass through eyes or staples *a a* in the side of the box or frame work and extend to the lower arm of the bail-levers F, to which they are fastened. These levers are pivoted at *b*, and extend through mortices in the planks a little distance above the road surface, across which they extend transversely in the form of a bail, as seen at H, in Fig. 2. The carriage wheels, approaching in the direction of the arrows, in passing over this bail, bear it down, as represented in Fig. 1, which throws the gates open by means of the chain, G, drawing the arm E in a counter direction. As the gate opens it raises the latch, I, which falls and secures it. The latch is formed with two stops or notches, *c d*, and is raised to release the gate by the small elbow lever J, with a link or wire, *e*, passing from its lower arm around the upper part of lever F. As the bail, H, is depressed by the forward wheels of the carriage, by actuating lever J, through the link *e* the latch is raised and the gate released from catch *c*. A cam *f* is provided on the upper side of the latch which strikes the middle rail of the gate and throws the latch down, which catches again by *d* but as the hind wheels strike the bail the latch again rises from the impulse, and the gates close. This double action of the latch is a provision against the gates closing so soon as to strike the carriage, and enables the bail levers to be placed nearer the gate rendering the construction more compact and cheap.

A spring *m* is employed on the model to insure the return of the lever J, to its former position and allow the latch to fall, but this can be dispensed with in practice, as the weight of the latch is sufficient to insure this result.

When the carriage has, by passing over the second bail, released the gates, the weight K, which is attached to arm, E, by a chain, or its equivalent, draws the gates close. When closed the gates are secured by the gravitating traps, L L. These traps are hinged at *g*, and from them bent rods extend to the opposite end, through the floor below, in an eye at the end of which a cord or chain *o* is attached, and also to weights M. These weights are suspended by a rod or rigid handle from the flooring, and are connected with the traps in such a manner that in gravitating to the perpendicular they draw upon the bent rods of the traps L, and keep them raised a few inches above the surface of the floor so as to secure the gates from being pushed open from either direction. But the depression of the bail lever H, throws the weight M, up, by means of an arm K, from the lever (best shown in Fig. 2.) which strikes and raises the rod by which it is suspended, thus leaving the trap to sink by its own gravity, which it does when the cord *o* is not taut, and allows the gate to be opened. Lever F, acts simultaneously to throw the gates open and depress the trap, the parts working conjointly to produce this result.

The cords actuating the traps are colored red in the drawings to distinguishing them from those which operate the gates.

These improvements by their simplicity and efficiency render the operation of automatic gates fully capable of practical adoption and use.

We are aware that gates have been operated by chains, levers and weights in various methods, and this we do not claim, but

What we claim as our invention and desire to secure by Letters Patent, is—

1. Actuating the traps L L, by means of the weight M, and cord *o* arranged in combination with the lever F, or its equivalent, for operating automatic gates substantially in the manner and for the purposes shown and described.

2. We also claim the construction and operation of the double acting latch I, in combination with an automatic gate for carriages, substantially in the manner and for the purpose set forth.

J. H. BUTLER.
P. G. VAN HOUTEN.

Witnesses:
A. M. SPOONER,
S. D. SHUTTUCK.